Aug. 24, 1965
H. D. HINNAH ETAL
3,201,984
ELECTRIC SENSORS AND CIRCUITS
Filed March 19, 1962
2 Sheets-Sheet 1
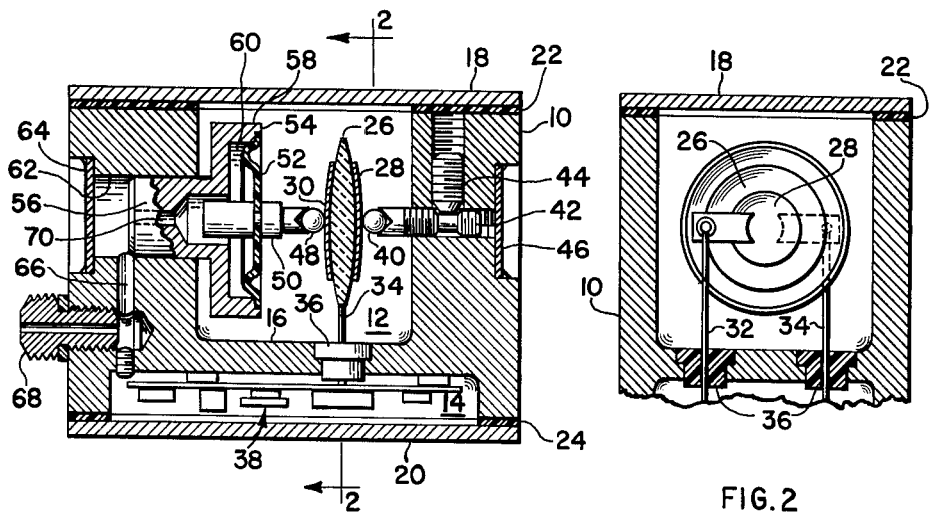
FIG. 1
FIG. 2
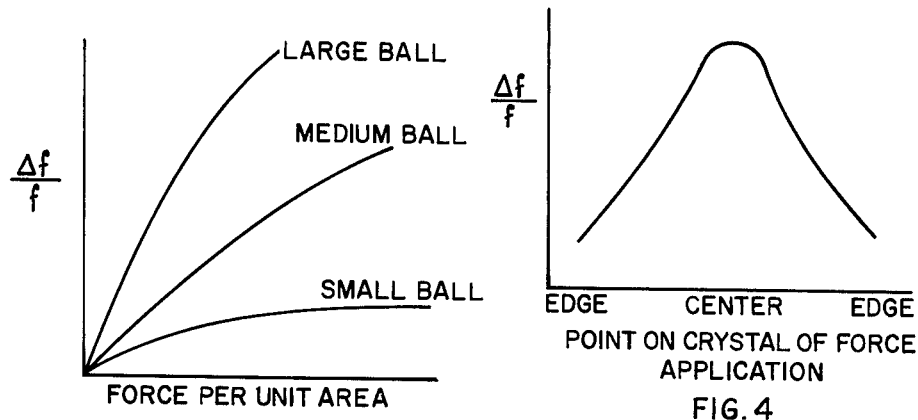
FIG. 3
FIG. 4
INVENTOR.
HOWARD D. HINNAH
BY DARRELL E. NEWELL
ATTORNEY Aug. 24, 1965    H. D. HINNAH ETAL    3,201,984
ELECTRIC SENSORS AND CIRCUITS
Filed March 19, 1962    2 Sheets-Sheet 2

INVENTOR.
HOWARD D. HINNAH
DARRELL E. NEWELL
BY
ATTORNEY

3,201,984
ELECTRIC SENSORS AND CIRCUITS
Howard D. Hinnah and Darrell E. Newell, Davenport, Iowa, assignors to The Bendix Corporation, Davenport, Iowa, a corporation of Delaware
Filed Mar. 19, 1962, Ser. No. 180,579
1 Claim. (Cl. 73—141)

This invention relates to condition measurement and it relates in particular to measurement of the state of a condition by application of force indicative of the state of the condition to the active faces of the crystal of a crystal controlled oscillator thereby altering oscillator frequency in proportion to the state of the condition.

One object of the invention is to provide measuring devices having a high degree of sensitivity and accuracy.

Another object is to provide an improved accelerometer.

Another object is to provide an improved force-to-frequency transducer.

Other objects and advantages of the invention will be apparent from the accompanying specification and drawing which describe one embodiment of the invention. It is to be understood that various modifications may be made in the embodiment illustrated and that other embodiments of the invention may be made without departing from the spirit of the invention or the scope of the appended claims.

In the drawing:

FIG. 1 is a cross-sectional view of an acceleration responsive device embodying the invention;

FIG. 2 is a fragmented, cross-sectional view taken on line 2—2 of FIG. 1;

FIGS. 3 and 4 are graphs illustrating operating characteristics of devices made according to the invention.

Figure 5:
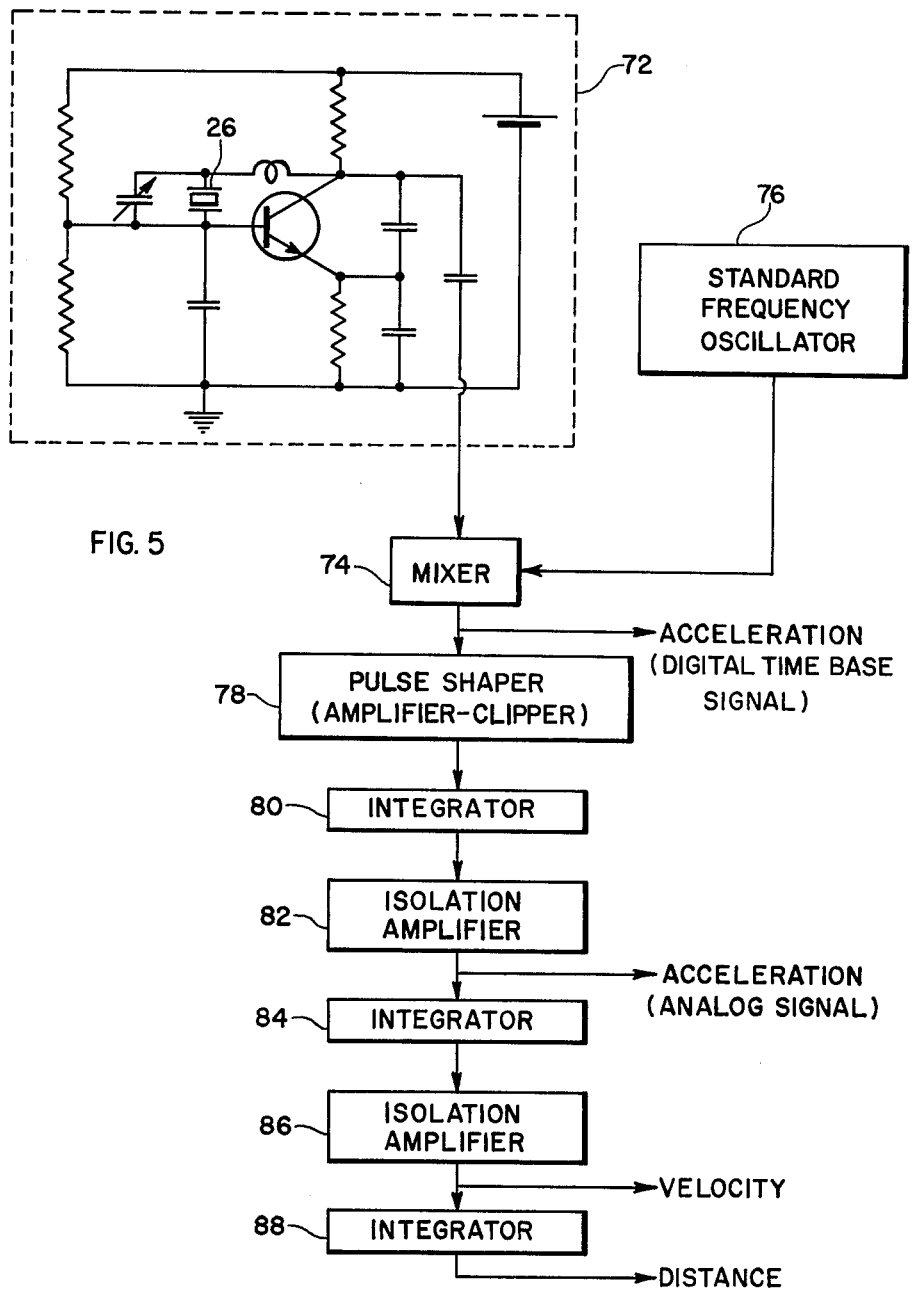
FIG. 5 is a partly diagrammatic and partly schematic showing of the electrical circuit of the device of FIG. 1.

The invention is applicable to crystals whose electrodes are bonded to the crystal faces as distinguished from the construction in which the electrodes comprise metallic plates placed, and pressed, against the crystal faces. These two constructions have different electrical characteristics as demonstrated by their respective equivalent circuits. It will suffice to compare the simplified form of the equivalent circuit which is customarily drawn to define only fundamental frequency operations. In the case of metallic plate electrodes, the equivalent circuit comprises the series circuit combination of a capacitor, a parallel circuit and a second capacitor in that order. The parallel circuit includes a capacitor in one leg and the series combination of a capacitor, an inductor and a resistor in its other leg. In the case of the bonded electrodes the equivalent circuit consists only of the parallel circuit.

Changing the force with which the metallic plates are pressed against the crystal faces alters the value of the two end capacitors in the equivalent circuit for this construction. It is a condition for oscillation in an electric oscillator that the phase angles of current and voltage add to an integral multiple of 360 electrical degrees. If a crystal with metal plate electrodes is employed as the frequency control element in such an oscillator, and if the force by which the electrodes are pressed against the crystal is changed whereby the value of the two end capacitors in the equivalent circuit is changed, then the crystal frequency must change so that the 360 degree phase shift requirement will continue to be satisfied. It is possible then to make small frequency corrections in oscillators employing such crystals by changing the pressure applied to the electrode plates.

The invention, however, employs crystals with electrodes bonded to the crystal faces. The equivalent circuit for this construction does not include the two end capacitors. Application of force to its electrodes is equivalent mechanically and electrically to applying a force to the crystal itself to contact the lattice structure of the crystal and to change the magnitude of the components in the parallel equivalent circuit. The crystal lattice being a very stable and very elastic structure, the effect of a force which alters lattice shape is far more predictable and repeatable than the effect of a force which is applied to change the effective electrical spacing between a metal plate and the crystal which mechanically must remain in contact with the plate.

In the matter of the character of the bond between the electrode and crystal in a bonded electrode crystal, it is essential only that the electrical effect of the electrode appear in the parallel equivalent circuit, and that the electrode be sufficiently thin, that is flexible, in areas apart from the area of force application so that the effective area of force application may be less than the area of the electrode if that is desired as it always will be in practice. Application of the electrodes by metal sputtering and plating techniques are among the methods that provide suitable crystals for use in the invention.

Referring to FIGURE 1, the unit there shown comprises a housing 10 having upper and lower recesses 12 and 14 formed in its upper and lower faces, respectively, which are separated by a partition wall 16. Top and bottom cover plates 18 and 20 together with their respectively associated sealing gaskets 22 and 24 are secured by fasteners, not shown, to the top and bottom faces of the housing, sealing shut the recesses 12 and 14.

A crystal 26 is disposed in recess 12. Its electrodes 28 and 30 each cover portions of a respectively associated one of its opposed active faces. Electrode 28, but not electrode 30, is connected to a supporting conductor 32 and electrode 30, but not electrode 28, is connected to a supporting conductor 34.

These supporting conductors extend, each through one of a pair of insulating bushings 36 into recess 14, and are connected to the electronic apparatus, generally designated 38, which is housed in recess 14 and which is described by FIGURE 5.

Means are provided for applying a force across the active face of the crystal. Advantageously this means comprises, as shown, a polished synthetic sapphire ball 40 which bears against the electrode 28 in line with the center of crystal 26. The ball 40 is held in place by and in a recess formed in the end of a threaded support rod 42 which is threaded into a hole formed in a side wall (right wall in FIG. 1) of recess 12. A set screw 44 holds the rod 42 firmly in place after adjustment by rotation of the rod. A seal 46 soldered to the housing 10 seals the hole from the outside atmosphere.

The means for applying a force to the crystal further comprises a second sapphire ball 48 which bears against electrode 30 and is held in place by means for varying the force with which the ball is made to bear on the electrode. In this embodiment this means comprises a seismic mass 50 mounted in the center of a diaphragm 52 and terminating at its right end in a recess in which the ball 48 is disposed.

The diaphragm 52 is secured at its periphery, as by soldering for example, to the rim 54 of a holding member. The holding member is circular in cross section, the left end 56 having smaller diameter than the right end 58 which is recessed. The diaphragm 52 covers this recess such that the recess forms a pressure chamber 60. The left end 56 forms a shank which is press-fitted into a bore 62, formed through that portion of the housing 10 which forms the left wall (in FIG. 1) of recess 12, tightly to seal against the passage of gas between the shank and the wall of the bore. The enlarged outer end of bore 62 is sealed shut by a seal member 64 soldered to the housing 10 to complete the seal.

A passage 66 extending through the housing, laterally from bore 62 communicated with the passage of a pressure fitting 68 which is fastened to the housing. Communication from this fitting is completed through the passage of the fitting, passage 66, bore 62, and a hole 70 along the axis of shank 56, to the pressure chamber 60.

The diaphragm 52, in addition to being movable in response to pressure variation in chamber 60 whereby to vary the force applied to crystal 26 through the mass 50 and ball 48, serves as a resilient support for the mass 50.

In operation of the device, the mass 50 will be displaced to the left relative to the crystal, which has less mass, as the housing and crystal are accelerated to the right. Thus the force applied across the crystal will be reduced. When the housing and crystal are accelerated to the left in FIG. 1 the mass will move to the right relative to the crystal and the force across the crystal faces will be increased.

In addition to the mass 50 and diaphragm which here acts as a spring, the acceleration sensing mechanism includes means for damping movement of the mass. The magnitude of damping that must be provided in any given application of the device is determined by the rate at which acceleration is changed and the character of the desired output signal. The embodiment shown includes a small amount of damping which is provided by resistance to movement of air between mass 50 and the wall of hole 70 which is enlarged at the right end of the shank to accommodate the end of the mass. The space between this wall and the mass constitutes a restricted passage for movement of air into and out of chamber 60 the volume of which changes when the mass moves relatively to the housing. The passageway terminating in fitting 68 provides a means for adjusting the pressure in chamber 60 and so the force across crystal 26 to compensate for such factors as temperature and air density change.

The effect of change in the force applied to the crystal is to alter the oscillation frequency of an electronic oscillator in which the crystal is connected as a frequency determining element. The relation between frequency change and force is depicted in FIG. 3. A change in force, other conditions being constant, results in a frequency change $\Delta f$ the magnitude of which in number of cycles per second depends on the oscillation frequency $f$ at the point of zero force. Thus frequency change is designated $\Delta f/f$. FIG. 3 includes three of a family of curves which show that frequency change per increment of force change increases as the area over which the force (per unit area) is applied, in this case by changing the diameter of the sapphire balls. FIG. 4 shows that the frequency change increases as the point or area of application of force is moved toward the center of the crystal, the magnitude of force and size of the area of application remaining constant.

The curves are not linear but portions of them are nearly linear. Accordingly, it is possible by selection of a base crystal frequency $f$, an initial force to represent that state which is to be considered the base state of a condition, an area size for force application, and an area location on the crystal for force application such that oscillator frequency change is not only substantially linear with changes in the state of the condition but so that a convenient number of cycles per second change in frequency corresponds to an integral number of units in which the state of the condition is commonly represented. For example in one model of the instrument shown in FIG. 5 the center of force application was the center of the crystal whose base operating frequency $f$ was 2.5 mc. cycles per second. In that instrument frequency changed 50 cycles per G of acceleration and deceleration.

If temperature compensation is desired, an X axis crystal cut at the AT or BT angle is preferred.

The electrical phase of the instrument is illustrated in FIG. 1. The crystal 26 is connected in a conventional electronic oscillator 72 which in the embodiment selected for illustartion is a Pierce oscillator.

The output of oscillator 72 is combined in a mixer 74 with the output of a standard frequency oscillator 76 which oscillates at the initial frequency of oscillator 72. The mixer output is a signal whose frequency is the difference between the frequencies of oscillators 72 and 76 and is thus a time-base, digital signal proportional to deviation in force on the crystal from the force which produces the initial frequency.

The mixer output is applied successively to pulse shaper 78 (an amplifier-clipper to produce square wave pulses), an integrator 80, isolation amplifier 82, integrator 84, isolation amplifier 86, and a final integrator 88. Integrators 80, 84, and 88 are conventional integrating operational amplifiers and the isolation amplifiers are ordinary amplifiers.

The mixer output is a digital signal indicative of acceleration. An analog signal proportional to acceleration is available at the output of the integrator 80 or isolation amplifier 82. An analog velocity signal is available at the output of integrator 84 and amplifier 86 and an analog speed signal is available at the output of integrator 88.

Returning to FIG. 1, such apparatus has been employed to measure atmospheric pressure and may, in fact, be employed to measure the state of any condition which is represented by the magnitude of force exerted across the crystal faces. In the particular form shown, the state of the condition may be represented conveniently by the magnitude of pressure applied through fitting 68 to diaphragm 52. Thus the invention provides a force or pressure-to-frequency transducer of general application. In cases where a condition other than acceleration is to be measured when the device is subject to acceleration the mass 50 would be made as small as possible. Thus in such airborne applications as altitude, speed, and mach number sensing, the element 50 would have very small mass.

We claim:

In a force responsive measuring instrument: a crystal controlled electronic oscillator including a piezoelectric crystal having a pair of exciting electrodes comprising thin metallic layers bonded to its opposite active faces, means for applying across said faces a force variable in magnitude from a selected initial force, said means including elements engaging said electrodes in the vicinity of the midpoint of said active faces and having substantially spherical surfaces at their points of engagement with said electrodes; and means for measuring the oscillation frequency of said oscillator in terms of deviation from its oscillation frequency when said crystal is subjected to said initial force.

References Cited by the Examiner

UNITED STATES PATENTS

| | | | |
|---|---|---|---|
| 2,123,236 | 7/38 | Fair | 310—9.4 |
| 2,240,453 | 4/41 | Wolfskill | 310—9.4 |
| 2,371,626 | 3/45 | Kecskemeti | 73—516 |
| 2,728,868 | 12/55 | Peterson | 310—8.4 |
| 3,033,043 | 5/62 | Runft | 73—517 |

FOREIGN PATENTS 754,593 10/52 Germany.

RICHARD C. QUEISSER, *Primary Examiner.*

SAMUEL LEVINE, JAMES J. GILL, *Examiners.*